(12) United States Patent
Lyubarsky et al.

(10) Patent No.: US 11,703,747 B2
(45) Date of Patent: Jul. 18, 2023

(54) SOLID STATE ILLUMINATION FOR OPTICAL PROJECTOR USING STATIC PHOSPHORS

(71) Applicant: Texas Instruments Incorporated, Dallas, TX (US)

(72) Inventors: Alexander Lyubarsky, Dallas, TX (US); Kristofer Scott Oberascher, Van Alstyne, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/108,202

(22) Filed: Dec. 1, 2020

(65) Prior Publication Data
US 2022/0171265 A1    Jun. 2, 2022

(51) Int. Cl.
  *G03B 21/20* (2006.01)
  *G03B 33/10* (2006.01)
  *G03B 21/28* (2006.01)

(52) U.S. Cl.
  CPC ........... *G03B 21/204* (2013.01); *G03B 21/28* (2013.01); *G03B 33/10* (2013.01)

(58) Field of Classification Search
  CPC ....... G03B 21/204; G03B 21/28; G03B 33/10
  See application file for complete search history.

(56) References Cited

U.S. PATENT DOCUMENTS

| | | | |
|---|---|---|---|
| 6,547,400 B1* | 4/2003 | Yokoyama | G03B 21/2033 353/98 |
| 9,568,816 B2 | 2/2017 | Ferri et al. | |
| 2009/0128781 A1* | 5/2009 | Li | G02B 27/0994 353/20 |
| 2010/0149496 A1* | 6/2010 | Inoue | H04N 9/3111 353/98 |
| 2011/0211333 A1* | 9/2011 | Bartlett | F21V 9/08 362/84 |
| 2012/0019788 A1* | 1/2012 | Katou | H04N 9/3129 353/31 |
| 2012/0314411 A1* | 12/2012 | Nagasaki | F21V 3/08 362/231 |
| 2013/0100420 A1* | 4/2013 | Ferri | G03B 21/14 353/121 |
| 2014/0022512 A1* | 1/2014 | Li | G03B 21/14 353/31 |

(Continued)

*Primary Examiner* — Bao-Luan Q Le
(74) *Attorney, Agent, or Firm* — Michelle F. Murray; Frank D. Cimino (57) ABSTRACT

A system includes: a phosphor configured to receive first light having a first color, to produce second light having a second color responsive to the first light, and to transmit at least a first portion of the first light; a color wheel comprising a first colored segment configured to transmit light having a third color and a second colored segment configured to transmit light having a fourth color; a light tunnel optically coupled between the phosphor and the color wheel configured to transmit combined light including least a portion of the first light and the second light; wherein the first segment is configured to transmit the third color as first transmitted light and the second segment to transmit light of the fourth color as second transmitted light; and a spatial light modulator configured to modulate the first transmitted light and the second transmitted light.

20 Claims, 8 Drawing Sheets

(56) References Cited

U.S. PATENT DOCUMENTS

| | | | |
|---|---|---|---|
| 2015/0042963 A1* | 2/2015 | Nishimori | H04N 9/3111 353/57 |
| 2015/0049457 A1* | 2/2015 | Kroell | F21K 9/62 362/84 |
| 2015/0167907 A1* | 6/2015 | Hoehmann | G02B 26/008 362/84 |
| 2017/0139096 A1* | 5/2017 | Frederiksen | F21S 45/70 |
| 2017/0153535 A1* | 6/2017 | Lin | G03B 21/208 |
| 2018/0149955 A1* | 5/2018 | Akiyama | G03B 21/204 |
| 2018/0149957 A1* | 5/2018 | Maeda | H04N 9/3102 |
| 2018/0259156 A1* | 9/2018 | Hechtfischer | F21S 41/25 |
| 2018/0373131 A1* | 12/2018 | Tsai | H04N 9/3158 |
| 2019/0235368 A1* | 8/2019 | Liao | G03B 21/2066 |
| 2020/0032979 A1 | 1/2020 | Lyubarsky | |
| 2021/0302821 A1* | 9/2021 | Tajiri | G03B 21/00 |

* cited by examiner

SOLID STATE ILLUMINATION FOR OPTICAL PROJECTOR USING STATIC PHOSPHORS

BACKGROUND

Projectors are increasingly used in devices to display information for a user. Examples include "smart home" appliances such as laundry equipment, dishwashers, kitchen appliances, thermostats, and personal devices such as grooming appliances, security systems, and lighting controls. These projectors may project onto a surface in front of or nearby an appliance such as on a floor surface, a wall surface or another surface of the appliance to display visual information useful to a user. Examples of information displayed by the optical projector include text messages or graphic images indicating remaining cycle time, messages about supplies or settings, error messages, on/off status, and "in use" or "time remaining" status messages. It is desirable for such systems that the optical projector and related parts be of low cost, require low power, and take up minimal area. It is desirable that the number of lenses, mirrors, and illumination components be reduced when compared to other optical projector applications with higher image quality.

SUMMARY

A system includes: a phosphor configured to receive first light having a first color, to produce second light having a second color responsive to the first light, and to transmit at least a first portion of the first light; a color element configured to transmit light having a third color and configured to transmit light having a fourth color; a light tunnel optically coupled between the phosphor and the color element, the light tunnel configured to transmit combined light including least a portion of the first light and the second light to the color element; wherein the color element is configured to transmit light of the third color as first transmitted light and to transmit light of the fourth color as second transmitted light; and a spatial light modulator optically coupled to the color element, the spatial light modulator configured to modulate the first transmitted first light and the second transmitted light.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

The making and using of example arrangements that incorporate aspects of the present application are discussed in detail below. It should be appreciated, however, that the examples disclosed provide many applicable inventive concepts that can be embodied in a wide variety of specific contexts. The specific examples and arrangements discussed are illustrative of specific ways to make and use the various arrangements, and the examples described do not limit either the scope of the specification, or the scope of the appended claims.

For example, when the term "coupled" is used herein to describe the relationships between elements, the term as used in the specification and the appended claims is to be interpreted broadly, and is not to be limited to "connected" or "directly connected" but instead the term "coupled" may include connections made with intervening elements, and additional elements and various connections may be used between any elements that are "coupled." The term "optically coupled" is used herein. Elements that are "optically coupled" have an optical connection between the elements but various intervening elements can be between elements that are "optically coupled."

The term "phosphor" is used herein. A "phosphor" is an element that produces light by phosphorescence in response to receiving energy. In an example, a yellow phosphor receives light from a laser diode, and outputs yellow light. Phosphors can be transmissive, so that some of the light impinging on the phosphor travels through it, or can be reflective. A phosphor can be made reflective by adding a reflective backing, such as a mirrored surface. The term "static phosphor" is used herein, a "static phosphor" is a phosphor that may be stationary while in use.

The term "telecentric" is used herein. As used herein, a "telecentric" architecture for a projector has rays that are parallel to the main axis of the system, and has an effect of an entrance pupil placed at infinity. The term "non-telecentric" is used herein. As used herein, a "non-telecentric" architecture for a projector is one where the rays are not necessarily limited to being parallel to the main axis of the system.

The term "color element" is used herein. In the arrangements, color elements are used to provide colored light when illuminated by light. Examples include a color wheel with colored segments, a color filter with colored segments in different portions, and a reflective phosphor that has colored phosphor segments that produce colored light when illuminated.

The term "beam steerer" is used herein. As used herein, a beam steerer is an optical element with a reflective surface that moves to reflect light from an incoming optical beam away from the beam steerer at a desired direction. The beam steerer can move, tilt, rotate, or have elements that tilt to direct the optical beam to the desired direction.

In the arrangements, a laser diode and a static phosphor form an illumination source that provides illumination light. The illumination light is optically coupled to a spatial light modulator by a light integrator, for example by a light tunnel. The light tunnel homogenizes and increases the uniformity of the light from the illumination source. The light is directed from the light tunnel to a spatial light modulator where a pattern is displayed. Projection optics couples modulated light reflected from the spatial light modulator (SLM) to an output for the projector. In an example where the optical projector uses a non-telecentric architecture, the optical path from the light tunnel to the spatial light modulator does not have a prism, total internal reflection (TIR), or reverse total internal reflection (RTIR) element to separate light input to the spatial light modulator from the modulated light reflected from the spatial light modulator, reducing costs. Further, because the light tunnel or light integrator provides homogenization of the light, the example optical paths do not have fly's eye arrays or collimators. In an example, a color filter is placed between the illumination source and the light tunnel or at the output of the light tunnel. A beam steerer can be used to direct laser light to a phosphor portion that is aligned with a colored section of a color filter to produce the individual colors needed to illuminate the spatial light modulator. In another example, the color element is a wheel with colored sections. In yet another example, a color filter is a transmissive optical filter that passes light from the laser diode, while filtering light from the phosphor, to produce at least three colors. In some example arrangements, a single laser diode is used for illumination. In alternative arrangements, a separate laser diode can be used for each color, and a beam steerer or color wheel are not used, although the number of laser diodes is increased. Reflective static phosphor elements can be used in some arrangements. Alternatively a transmissive static phosphor can be used with the color filters. A phosphor with multiple color portions can be used, and in these arrangements the color filters are not present.

The arrangements use a light tunnel and static phosphor with a laser diode to provide a compact, low cost, and low power optical projector. Applications that are particularly well suited for these optical projectors include low lumens applications, such as for industrial equipment, appliances and consumer goods that display text or graphics information by projecting an image on a surface. The arrangements can also be used in other applications where a low cost optical projector is needed.

Figure 1:
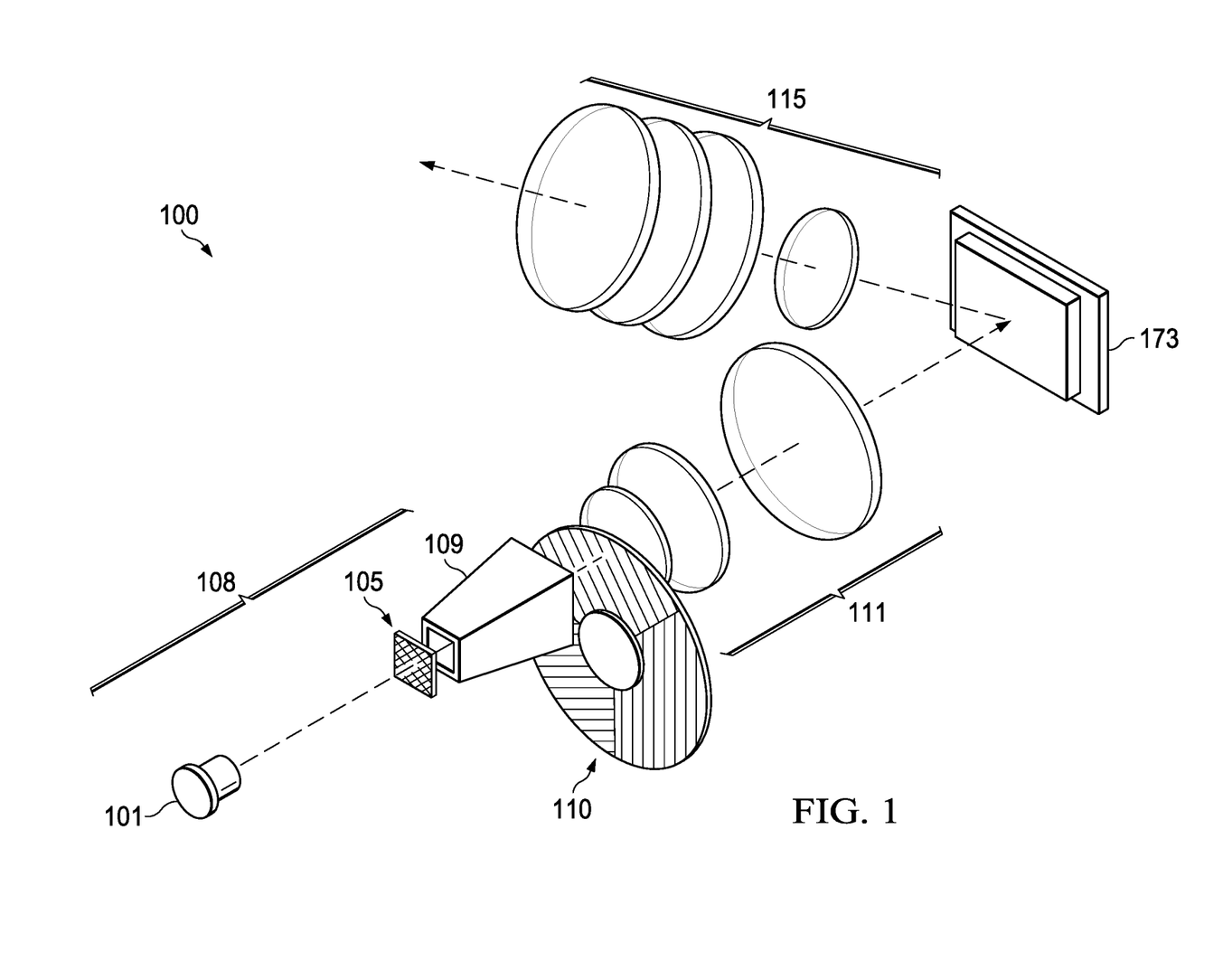
FIG. 1 illustrates in a simplified block diagram an example arrangement for an optical projection system with a static phosphor illumination source.

FIG. 1 illustrates in a block diagram an arrangement for a projection system 100. In FIG. 1, a laser diode 101 is shown providing light of a first color to a static phosphor 105 to form an illumination source 108. The phosphor 105 is transmissive. The light from the laser diode 101 is, in this example, blue, and the laser diode is a blue laser diode. Static phosphor 105 phosphoresces to produce light of a second color when illuminated by light. In this example, the static phosphor 105 is a yellow phosphor. When the static phosphor 105 is illuminated by the first light from the laser diode 101, it phosphoresces and produces a second light, yellow light, while some of the first light from the blue laser diode 101 is transmitted with the second light, the yellow light. The blue laser diode can have an output with a wavelength ranging between 440 to 470 nanometers. The combination of yellow light from phosphorescence of the phosphor 105 and blue light from the laser diode 101 transmitted through the phosphor 105 provides combined light, which when a blue laser diode is used with the yellow phosphor, is white light. The white light enters into an input end of light tunnel 109. The light tunnel 109 is internally reflective and improves the uniformity of the light as it traverses the light tunnel 109. A color element, here color wheel 110, receives the light from an output end of light tunnel 109 opposite the input end. In an example, color wheel 110 has a first colored segment that produces a third color, in this example red, a second colored segment that produces a fourth color, in this example green, and a third colored segment that produces a fifth color, in this example blue, although alternative color schemes can be used such as segments that include red, green, blue, yellow, cyan and/or magenta. Color wheel 110 is controlled to rotate in correspondence with the combined light from laser diode 101 and phosphor 105, so that when the combined light from the light tunnel 109 illuminates a segment of the color wheel 110, colored light of the selected color is provided as transmitted light to the illumination optics 111 and to an SLM 173. Illumination optics 111 can include collimators, which reduce the divergent angle of light beams to make the light path of the beams more consistent, and relay optics, which lengthen the light path by extending the parallel beams towards the SLM 173. The SLM 173 is used to display image patterns that modulate the first transmitted light of the third color, the second transmitted light of the fourth color, or third transmitted light of a fifth color, which in this example are red, green and blue. The modulated light is then projected by projection optics 115 to provide images for display. By providing red, green and blue patterned images displayed on the SLM 173 that modulates the transmitted light of the corresponding color from the color wheel 110 in sequence during a display frame time, a color image is projected by system 100. Because the human vision system integrates observed light, the projected color image is viewed with all of the colors present.

The light tunnel 109 is internally reflective and the reflections within the light tunnel make light traversing the light tunnel more uniform. The light tunnel 109 can be formed of reflective metal or foil. In an example the light tunnel 109 is formed from reflective aluminum. The reflective aluminum can be supported on a backing material. The light tunnel can be formed using a reflective liner material on a paper or film. Other reflective materials can be used. Foils, films, tapes and other reflective materials can be used. Other useful examples of light integrator 109 include a rod of optically transparent material with the outside surface coated with a reflective material except for the input face and output face; a rod of optically transparent material that is uncoated that uses total internal reflection (TIR); and others. U.S. patent application Ser. No. 16/425,517, titled "LOW COST PROJECTION SYSTEM", which is hereby incorporated by reference herein in its entirety, describes light tunnels made from reflective material and methods for making the light tunnels.

Color is provided in system 100 by the color wheel 110. Components of the color wheel 110 are relatively inexpensive and have shown to be reliable. The system 100 uses "spoke chasing" in the image patterns displayed by the SLM 173. As the light from the color wheel transitions from red, for example, to green for example, the pattern displayed on the SLM 173 also has to transition from a red pattern to a green pattern as the "spoke" between the color wheel segments traverses the SLM 173.

Figure 2A:
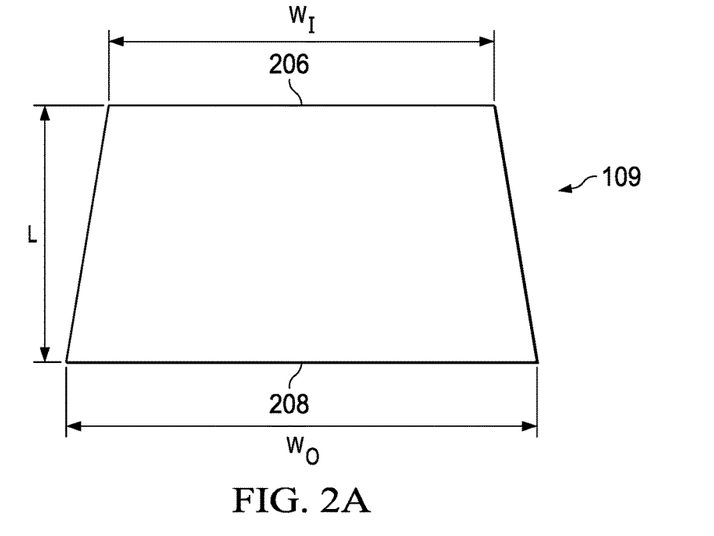
FIGS. 2A-2C illustrate views of a light tunnel for use with the arrangements.
Figure 2B:
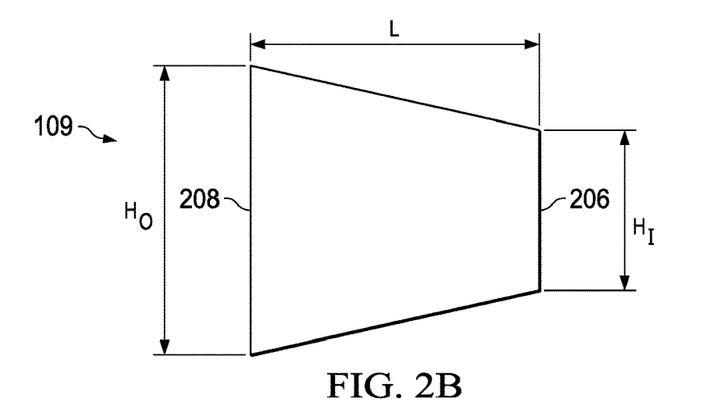
Figure 2C:
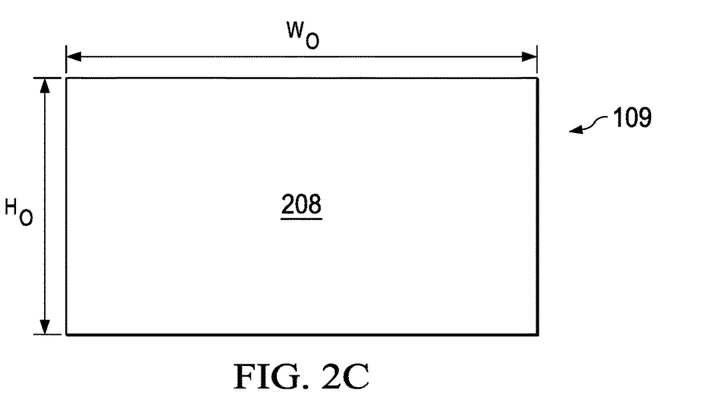

FIGS. 2A-2C (collectively, "FIG. 2") illustrate three views of an example light tunnel 109 in a top view, a side view, and a cross sectional view of the output end. In the example of FIG. 1, light integrator 109 is a light tunnel where the inside surfaces are reflective aluminum, for example. FIG. 2A is a top view of light integrator 109. As used herein, "top view," "side view," and "front view" are used to describe the relationship between the views of FIG. 2A, FIG. 2B, and FIG. 2C, respectively, and do not indicate any other physical relationship. As shown in the top view of FIG. 2A, light input face 206 has a width $W_I$. Light output face 208 has a width $W_O$. Light integrator 109 has a length L. FIG. 2B is a side view of light integrator 109. As shown in FIG. 2B, light input face 206 has a height $H_I$. Light output face 208 has a height $H_O$. FIG. 2C is a front view showing output face 208. As illustrated in FIG. 2C, the light tunnel 109 can have a rectangular cross section, although other shapes can also be used.

In the example of FIG. 2, width $W_O$ is greater than $W_I$, and height $H_O$ is greater than $H_I$. Thus, the output area of output face 208 is greater than the input area of input face 206. Light tunnels are light integrators that convert non-uniform light to more uniform light. In an example, $W_O$ is 8 mm, $H_O$ is 4.5 mm and L is about 15 mm. The configuration of this example provides an output face with a 16:9 aspect ratio that matches the aspect ratio of many spatial light modulators. This example configuration of light tunnel 109 further simplifies the optics necessary to focus the light pattern onto the spatial light modulator, because it avoids the need for any anamorphic stretching or shrinking in any direction. When using spatial light modulators having other aspect ratios, the dimensions of output face 208 can be configured to better match the other aspect ratios. However, although matching the aspect ratio of output face 208 to the spatial light modulator is desirable in certain configurations to improve efficiency, it is not necessary. Although specific example measurements are shown above, they do not limit the scope of this example light tunnel.

Although the example light tunnel 109 is shown as a four sided open tunnel, in alternative arrangements, the light tunnel 109 can have a varying number of sides, and the end openings can be rectangular, square, or form another shape. The dimensions of the smaller input end, the larger output end, and the length of the light tunnel can vary to change the pattern of light received at the SLM. The intensity of the light in a central portion of the beam can be increased over the sides, or decreased compared to the sides, by varying the length and shape of the light tunnel.

The size and shape of the light tunnel can be varied to better match the illumination pattern from the light tunnel to the SLM used in an arrangement, to improve the uniformity of the illumination on the surface of the SLM. The size of the aperture openings (area of the end openings) of the light tunnel will vary based on an Etendue matching of the light tunnel and of the optics used to couple light to the SLM. The light tunnel size dimensions will change the light cone in the illumination path and the angles, which can be changed to match the SLM acceptance angle and cone dimensions. In some example arrangements, such as shown in the examples illustrated here, the light tunnel is tapered, so that the input end (closer to the illumination source, the static phosphor) has an area that is less than the area of the output end (closer to the SLM). In an alternative arrangement, a straight tunnel, with the same areas for the input and output ends, would output the same ray angles as at the input, which would be Lambertian+/−90 degrees. The length of the tunnel can vary, a very short tunnel will have a non-uniform light profile at the output with a high peak in the center, which can also be useful for illumination arrangements such as for headlamps. For a projector application, as is shown in the examples illustrated here, the tunnel length can be made longer but does not need to be very long to have adequate uniformity at the SLM, and the combination of the shape, aperture sizes, and length of the tunnel and any optics used can be used to vary the light cone. Various patterns that have more or less uniform light intensity can be obtained by simple measurements on different geometric shapes of the light tunnel until a suitable light tunnel is identified for an application. Simulation tools can be used to select a light tunnel with the desired uniformity of illumination at the SLM.

Figure 3A:
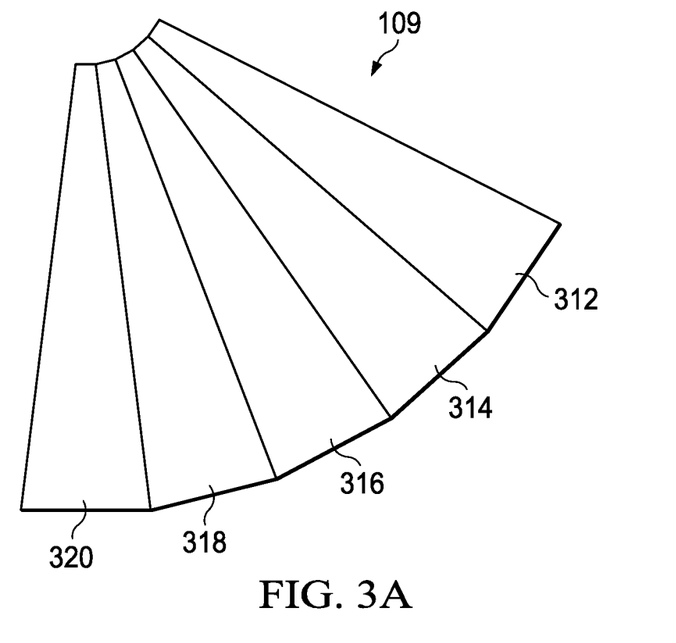
FIGS. 3A-3B illustrate views of a material for forming a light tunnel and a cross sectional view of a light tunnel for use with the arrangements.
Figure 3B:
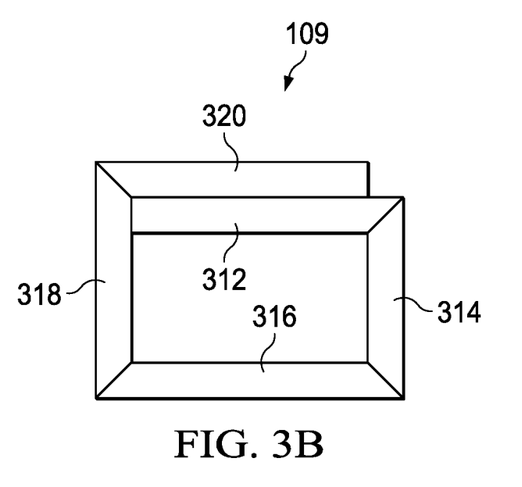

FIGS. 3A and 3B (collectively, "FIG. 3") illustrate a pattern in a sheet material used to form light tunnel 109, and a cross section of the light tunnel 109 after the light tunnel formation. In an example method, the sheet material is shaped to form a tapered light tunnel with an input end having a smaller cross sectional area than an output end, and having five panels 312-320 separated by folding creases. In FIG. 3A, the five panels are shown spaced by four creases. In FIG. 3B, the cross section shows a four sided tunnel 109 formed by folding the material along the creases so that panel 320, the left most panel in FIG. 3A, overlaps panel 312, the right most panel in FIG. 3A, after folding. In this manner the light tunnel has no exposed internal seams where light might escape. An alternative would have four panels, folded along three creases so that there is only one seam where light might escape, which can then be sealed. The light tunnel 109 can be completed using tack welds, adhesives, resins, or epoxies to secure the panels to one another. In yet another alternative, discrete panels can be used and secured to one another to form tunnel 109 using tack welds, epoxy, adhesives, tape or resin to secure the panels one to another and to seal the seams between the panels.

Figure 4A:
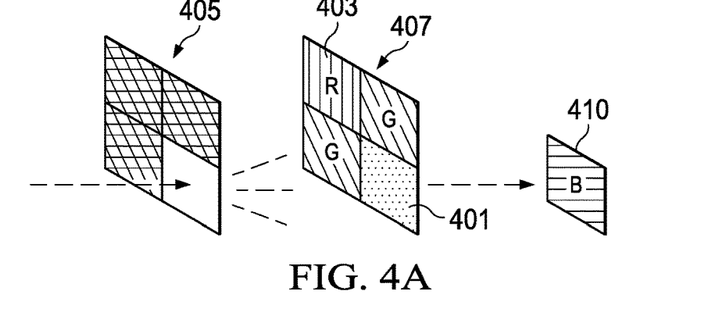
FIGS. 4A-4D illustrate the operation of a phosphor and color filter for use with the arrangements.
Figure 4B:
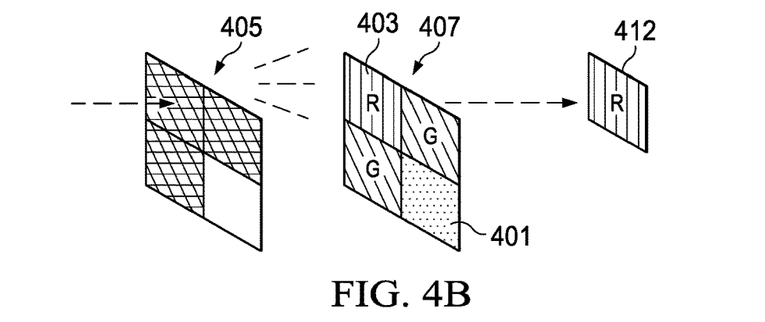
Figure 4C:
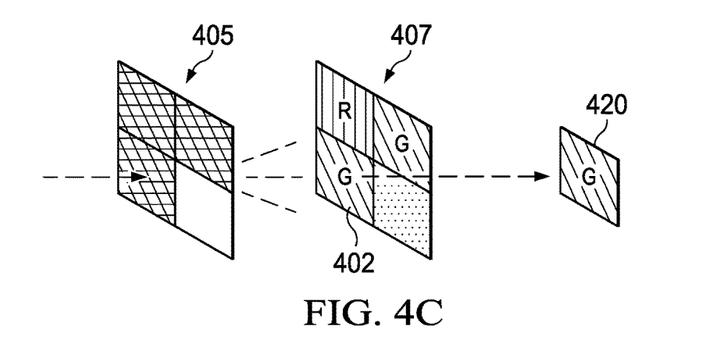
Figure 4D:
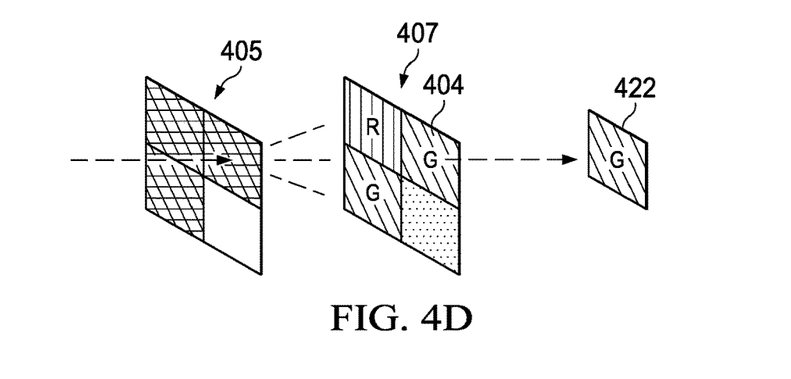

FIG. 4A illustrates the use of a static phosphor 405 and a color element, here color filter 407, to form blue light for use in the arrangements. In FIG. 4A, a laser diode (see FIG. 1, diode 101) outputs a light beam of a first color that is directed to a transparent or open portion of static phosphor 405. In the examples, a blue laser diode outputs blue light. The light of the first color then continues to the portion 401 of color filter 407 that has a transmissive diffuser portion, or a transparent or open portion. The light of the first color from the laser diode is then transmitted as blue light 410 (with the legend "B") and will be directed onto a reflective spatial light modulator. FIG. 4B illustrates the use of the phosphor 405 and color filter 407 to produce red light. In FIG. 4B, the blue light from a blue laser diode impacts transmissive phosphor 405 which outputs light of a second color, for example a yellow phosphor outputs yellow light. The phosphor is transmissive, so that some of the incident light is transmitted through the phosphor. The phosphor produces yellow light by phosphorescence in response to the blue light, and some of the blue light is transmitted through the phosphor 105 with the yellow light, forming combined light as a white light beam. The combined light is from the phosphor 105 is directed through the red portion 403 of a color filter 407, and the resulting red light 412 (with the legend "R") of a third color is then directed to a reflective SLM as shown in FIG. 1, for example. FIGS. 4C-4D illustrate the use of the phosphor 405 and color filter 407 to produce green light. In FIG. 4C, the combined light beam from the phosphor 405 is directed to a green portion 402 of the color filter 407. The resulting green light 420, which is light of a fourth color, is then directed to a reflective SLM. In FIG. 4D, the combined light from the static phosphor 405 is directed to a second green portion 404 of color filter 407, and green light 422 results, again designated "G". Due to the relative brightness of green light from the color filter 407, two portions of green are shown for the example color filter 407. The time that green image patterns are displayed by the SLM during a display frame time may be longer for green than for red, and for blue, to create the needed intensity in the observed image. The time an image is displayed is a display frame time. Subframe images are displayed on the SLM during the display frame time to provide images for each color. In a subframe sequence during a display frame time, the color images displayed by the reflective SLM may have more green images, for example the reflective SLM may display images and receive colored light to illuminate the images in a sequence of red, green, blue, green, using two subframe periods for the green image, while using one subframe time period for the red and blue images. Depending on the phosphor and color filter chosen, two red portions may be needed instead, and two red subframes can be displayed in a frame display time. In another approach, the green portions of color filter 407 could be combined into one larger portion, and a laser diode can illuminate both portions, perhaps with a higher power or more intensity than the other laser diodes, to produce the green colored light. The system will be operated to produce balanced color, so that when a white image is projected, for example, it is observed to be white.

Figure 5:
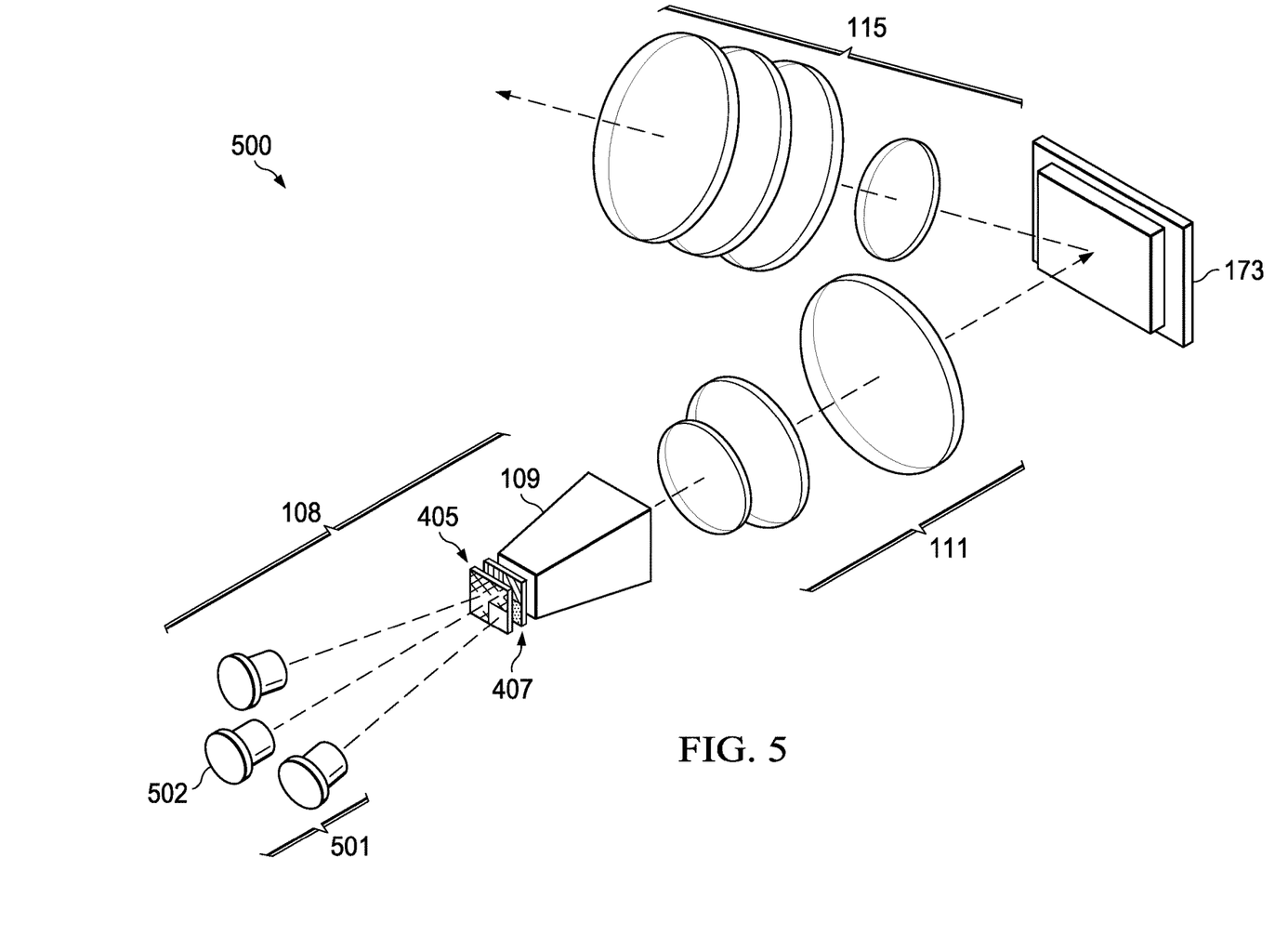
FIG. 5 illustrates in a simplified block diagram an alternative arrangement for an optical projection system with a static phosphor illumination source having multiple laser diodes.

FIG. 5 illustrates in another example a projector system 500. In FIG. 5, a light source 501 includes three independently controlled laser diodes 502, each directed at a different colored portion of a color filter 407 and a corresponding portion of phosphor 405 or at a transmissive portion of phosphor 405. Note that the example color filter 407 has four portions, while in system 500 only three laser diodes are shown so that only three portions of color filter 407, one for red, one for green, and an open or diffuser portion for blue, are used in illuminating the SLM 173. In an alternative, the color filter 407 could be divided into three portions instead four, eliminating the unused portion. For example, in a case where the green light has less brightness than the red, two green portions could be arranged adjacent and illuminated by one laser diode with increased intensity during the green color operations of the SLM. In this arrangement, the use of three individual laser diodes 502 with color filter 407 replaces the color wheel 110 used to create the three colors needed, such as red, green and blue, in FIG. 1. Instead, a different one of the three laser diodes 502 will be active for each display color, and the laser diode operations will be synchronized with the image patterns displayed on the SLM 173. The system 500 has no moving parts, which may increase reliability and reduce noise and vibration. The light from the illumination source 108 is input at one end of the light tunnel 109 and the output light beam from light tunnel 109 traverses the illumination optics 111 and is directed onto the reflective SLM 173. The SLM 173 displays an image for each of the three colors and the modulated light reflected from the SLM 173 is then output through projection optics 115 and the resulting color images are projected by the system 500. The individual color images are then integrated by the human vision system of a viewer to form a projected color image.

Figure 6:
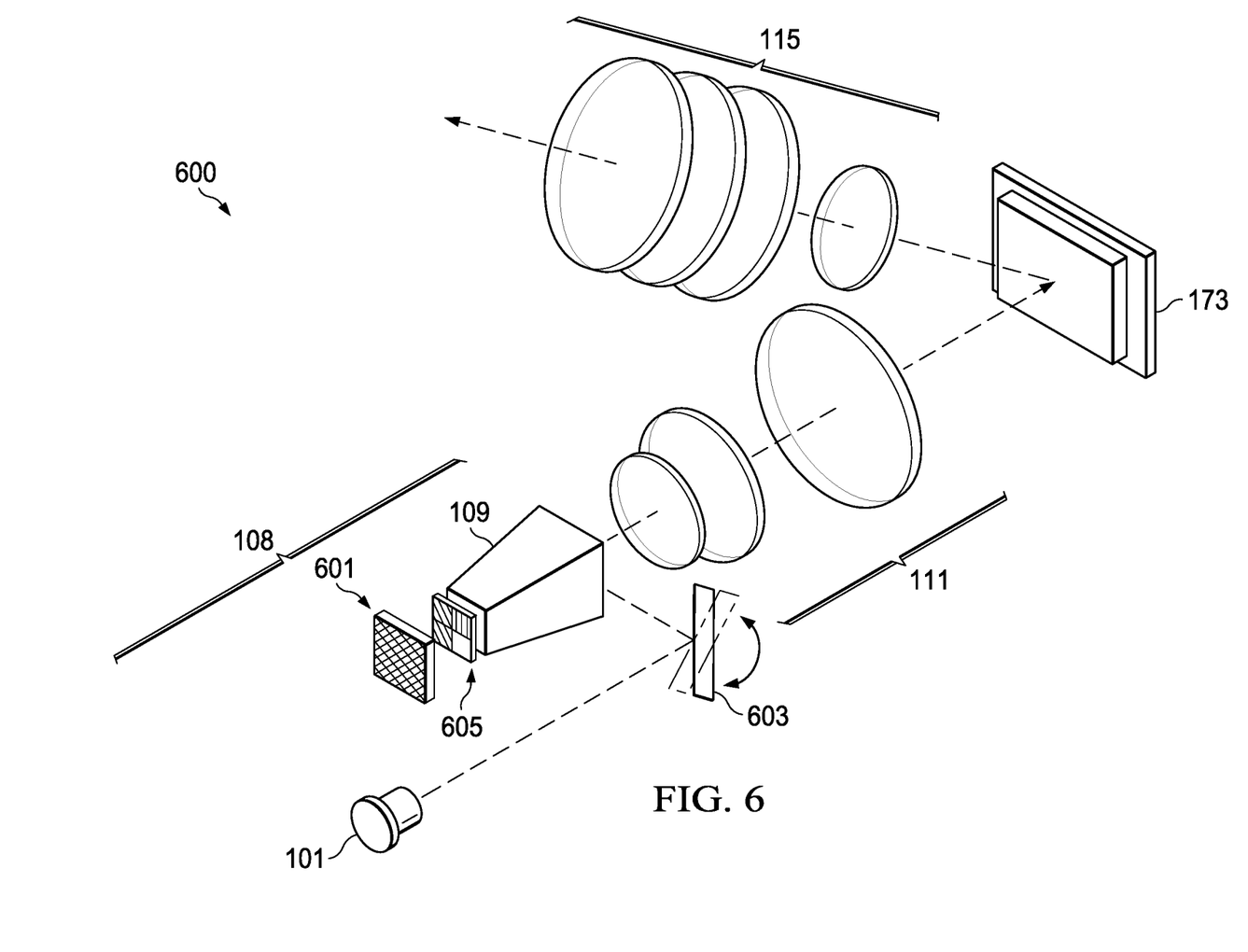
FIG. 6 illustrates in a simplified block diagram yet another alternative arrangement for an optical projection system with a static phosphor illumination source and a dual pass light tunnel.

FIG. 6 illustrates in a block diagram still another arrangement for a projector system 600. The laser diode 101 provides a light beam of a first color. In an example, the laser diode 101 is a blue laser diode, and the light of the first color is blue. The projector system 600 uses the laser diode 101 and a beam steerer 603, for example a galvonometer optical scanner (galvo) or voice coil actuator system, to steer the light beam received from the laser diode 101 into the output end of the light tunnel 109. Beam steerer 103 can be any of several useful beam steering devices, including galvo, voice coil actuator, micro-electromechanical system (MEMS) mirror devices, Braggs/Pockels/Kerr cells, or Risley prisms. The beam steerer directs the laser light by reflection to a particular portion of a color element, here reflective static phosphor 605, placed to receive light from the input end of a light tunnel 109. The light tunnel 109 in this arrangement is a "dual pass" tunnel, that is the light of the first color from laser diode 101 directed by the beam steerer 603 to the light tunnel and first traverses the light tunnel 109 from the output end to a reflective static phosphor 605 positioned near the input end of the light tunnel. A phosphor material that is transmissive can be made to be reflective by mounting it on a reflective surface, such as a mirrored surface. The static phosphor 605 has a reflective portion that reflects the light of the first color received from the input end of tunnel 109, for example blue light from a blue laser diode. The static phosphor has additional reflective portions that produce colored light, for example red and green colored light, by phosphoresce in response to the light received from the input end of light tunnel 109. The static phosphor 605 then transmits the colored light of blue, red or green colors. The colored light output by the reflective static phosphor 605 is transmitted to the input end of the light tunnel 109 and again traverses the light tunnel 109. The colored light is output from the output end of light tunnel 109 to the illumination optics 111, where the colored light is transmitted to the reflective spatial light modulator 173 as transmitted light. The SLM 173 then modulates the transmitted light. The modulated transmitted light is reflected into the projection optics 115 and output by the system 600 as color images. For each color of the transmitted light, the beam steerer 603 steers the light from the laser diode to a different portion of the reflective phosphor 605, and the SLM 173 displays a corresponding image for the color of the transmitted light. In an example, the blue light from the laser diode is used as the blue colored light by reflecting it from a reflective portion of the reflective static phosphor 605, while the red and green light is provided by phosphorescence as transmitted light from corresponding phosphor portions of the reflective static phosphor 605. The arrangement of system 600 enables the use of a thermal backplane 601 that can provide thermal transfer from the back of the reflective static phosphor 605. The thermal backplane 601 can also be used to mount, and therefore cool, the laser diode 101. Use of the thermal backplane 601 can improve performance of the reflective static phosphor 605 by reducing the temperature of static phosphor 605 in use, and possibly preventing thermal quenching. The reflective static phosphor 605 can include a red and green phosphor portion to transmit red and green colored light, and a reflective portion to transmit the blue light from laser diode 101. When the blue light from the laser diode illuminates the red or green phosphor portions of the reflective static phosphor 605, the material phosphoresces and produces the corresponding red or green colored light, which is transmitted to the light tunnel 109. When blue light from the laser diode strikes the reflective portion of the reflective static phosphor 605, the blue light is reflected to transmit blue colored light to the light tunnel 109. The beam steerer 603, with laser diode 101 and phosphor 605, provides red, green and blue colored light from the light tunnel 109 and into the illumination optics 111. SLM 173 is used to display image patterns corresponding to the selected color, the modulated color light is projected by the projection optics to form a color image for viewing.

Figure 7:
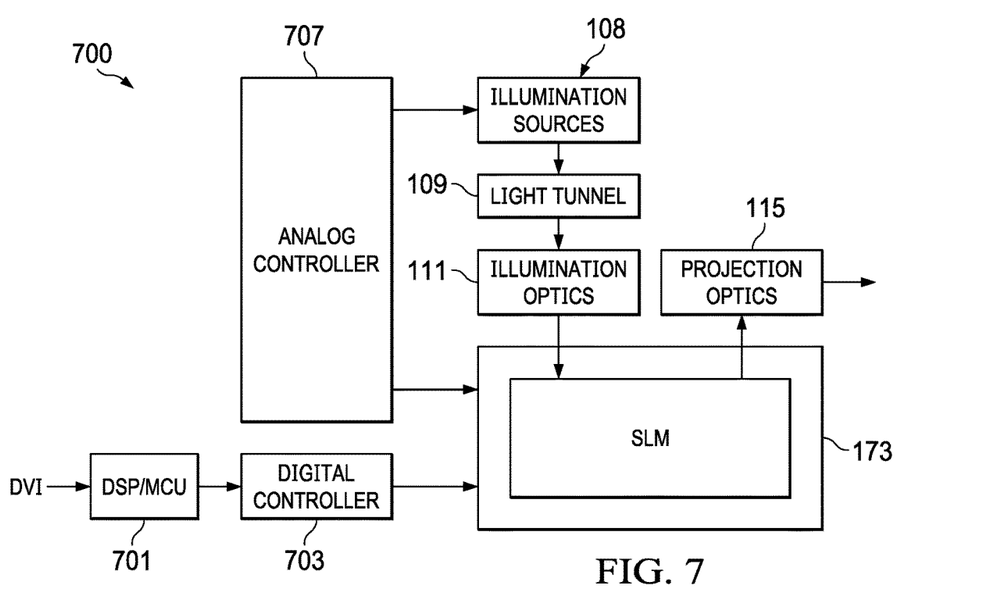
FIG. 7 illustrates in a block diagram a circuit for use with the arrangements.

FIG. 7 is a circuit diagram of an example arrangement 700 for use with the optical projection systems described above. A microprocessor, mixed signal processor, digital signal processor (DSP), microcontroller unit (MCU) or other processor 701 executes instructions that cause it to output digital video signals for display. A variety of sources may provide the digital video signals labeled DVI (digital video input) in FIG. 7, such as Internet browsers, stored files in video cards, flash cards, universal serial bus (USB) drives, solid state drives (SSDs), cameras, personal computers, game consoles, smartphones, camcorders, etc. The processor 701 is coupled to a digital SLM controller integrated circuit (IC) 703, which is another digital video processing integrated circuit. An analog controller IC 707 controls intensity and power of the illumination source 108. The digital SLM controller IC 703 provides digital data to the SLM 173 for modulating the illumination light that strikes the reflective surface of the SLM 173, and the analog controller 707 provides power and analog signals to the SLM 173. The light rays from the illumination sources 108 including the laser diodes and phosphors are provided to the light tunnel 109, and then to the illumination optics 111, and the colored light rays strike the surface of SLM 173. The reflected modulated light for projection leaves the surface of the SLM 173 and travels into the projection optics 115 as described above. Integrated circuits 703, 707 operate with the SLM 173 and the optical components to project images.

The spatial light modulator SLM 173 can be any field sequential SLM. The SLM 173 may be a liquid crystal on silicon (LCOS) SLM or a digital micromirror device (DMD).

Figure 8:
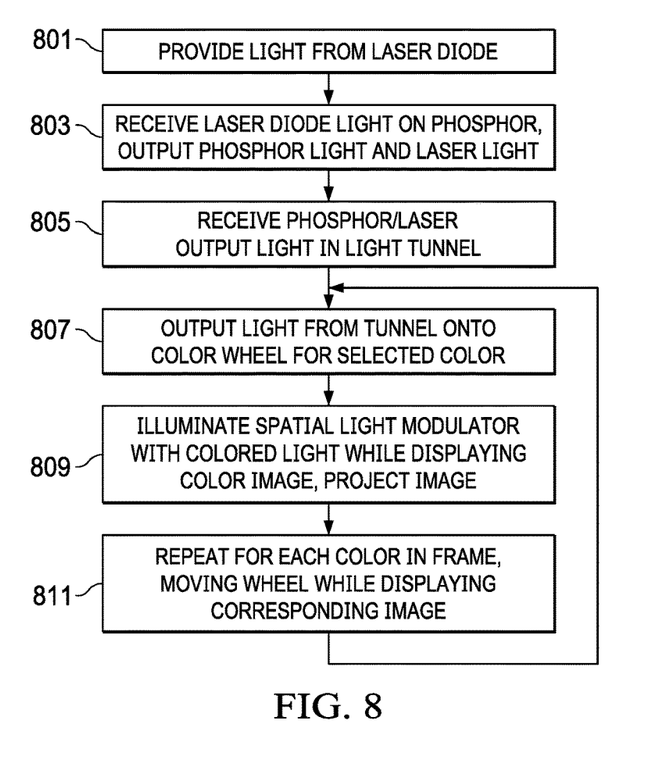
FIG. 8 illustrates in a flow diagram a method for use with an arrangement.

FIG. 8 is a flow diagram for a method for projecting an image. The steps of FIG. 8 describe operations for projecting images using the arrangement of FIG. 1. At step 801, light is provided from the laser diode, 101 in FIG. 1. At step 803, the phosphor 105 receives the laser diode light, the phosphor 105 outputs phosphor light and laser light. At step 805, the light tunnel 109 receives the output light from the phosphor 105. At step 807, the light output from the tunnel 109 is directed onto a color element, color wheel 110, which is set to a selected color. At step 809, the SLM 173 is illuminated using the colored light from the color wheel 110 while displaying a pattern image for the selected color. At step 811, for each color in a display frame, the color wheel is moved to output light of another color, while the pattern displayed on the SLM 173 changes to display the corresponding image for the selected color, and the process repeats from step 807-811. The modulated light is then projected by projection optics to form a color image.

Figure 9:
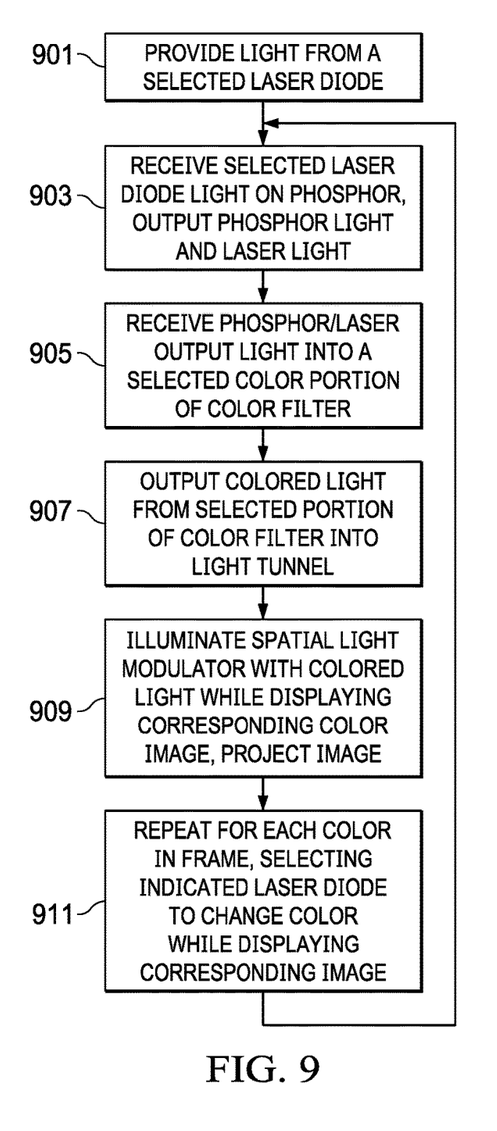
FIG. 9 illustrates in another flow diagram a method for use with another arrangement.

FIG. 9 illustrates a flow diagram for another method using the arrangement of FIG. 5. At step 901, a selected laser diode 502 provides light. At step 903, the light from the laser diode is received on a portion of a phosphor. The phosphor outputs phosphor light or laser light. At step 905, the light from the phosphor, or from a laser, is directed onto a color element, color filter 407. At step 907, the colored light from the color filter is input into the light tunnel, 109 in FIG. 5. At step 909, the light output from the light tunnel is used to illuminate the SLM 173, which is displaying a corresponding image pattern. At step 911, the process is repeated, changing the color by selecting another one of the laser diodes, and changing the pattern displayed on the SLM, for each color in the frame.

Figure 10:
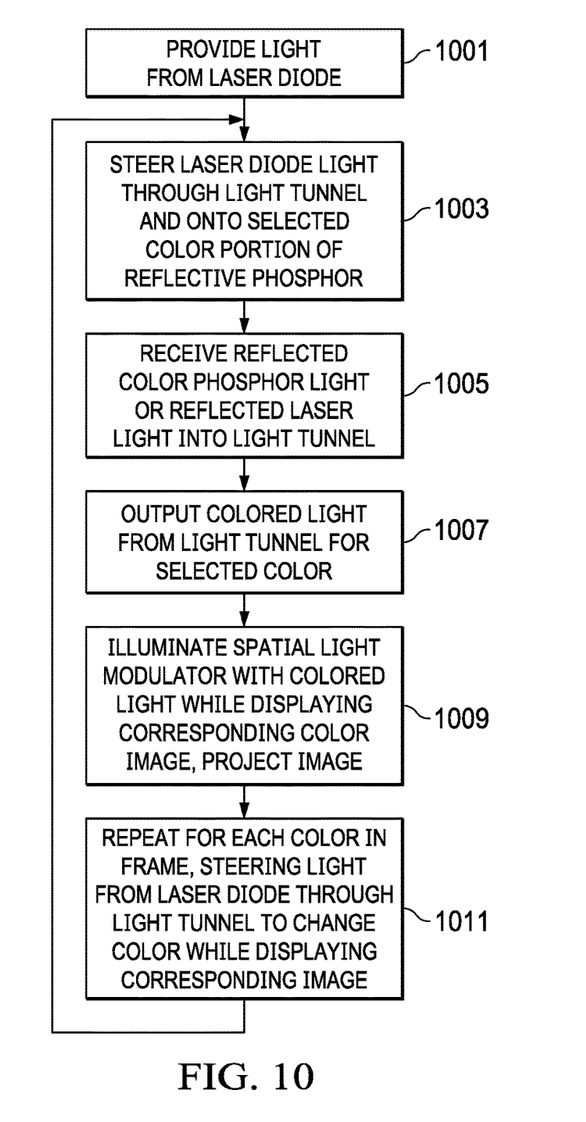
FIG. 10 illustrates in a flow diagram a method for use with an alternative arrangement.

FIG. 10 illustrates a flow diagram for a method using the arrangement in FIG. 6. At step 1001, light is output by the laser diode 101. At step 1003, the beam steerer 603 directs the light through the light tunnel and onto a color element, a reflective phosphor 605. At step 1005, the colored light reflected from the phosphor 605 is directed into the light tunnel 109. At step 1007, the colored light from the light tunnel is output towards the SLM 173. At step 1009, the SLM is illuminated with the colored light while displaying a corresponding image for the selected color. At step 1011, the process is repeated for each color in a frame, starting with step 1003, and continuing through step 1009, while the pattern displayed on the SLM is changed to display the image for the corresponding color.

Although the example illustrative arrangements have been described in detail, it should be understood that various changes, substitutions and alterations can be made herein without departing from the spirit and scope of the present application as defined by the appended claims. For example, where a single laser diode was shown, multiple laser diodes or an array of laser diodes can be used. Where a yellow static phosphor was shown with a color filter, a static phosphor having multiple color portions can also be used. Where a transmissive phosphor was shown, a reflective phosphor can also be used. Accordingly, the appended claims are intended to include within their scope processes, machines, manufacture, compositions of matter, means, methods, or steps that provide equivalents to the examples disclosed.

What is claimed is:

1. A system comprising:
   a light tunnel;
   a color filter optically coupled to the light tunnel, the color filter having a first half and a second half, the second half having a first quarter and a second quarter, the color filter comprising a first color filter segment in the first half, a second color filter segment in the first quarter, and a first open segment in the second quarter;
   a transmissive static phosphor optically coupled to the color filter, the transmissive static phosphor comprising a transmissive phosphor segment and a second open segment;
   a first light source optically coupled to the transmissive phosphor segment, the first light source configured to produce first light having a first color, the transmissive phosphor segment configured to produce second light having a second color and a third color in response to receiving the first light, and the first color filter segment configured to transmit a portion of the second light having the second color and to direct the portion of the second light towards the light tunnel;
   a second light source optically coupled to the second open segment, the second light source configured to produce third light having the first color, the second open segment configured to transmit the third light, the first open segment configured to transmit the third light and direct the third light towards the light tunnel; and
   a third light source optically coupled to the transmissive phosphor segment, the third light source configured to produce fourth light having the first color, the transmissive phosphor segment configured to produce fifth light having the second color and the third color in response to receiving the fourth light, and the second color filter segment configured to transmit a portion of the fifth light having the third color and to direct the portion of the fifth light towards the light tunnel.

2. The system of claim 1, wherein the first light source is configured to produce the first light during a first time interval, the second light source is configured to produce the third light during a second time interval, and the third light source is configured to produce the fourth light during a third time interval.

3. The system of claim 1, further comprising:
a spatial light modulator (SLM); and
illumination optics optically coupled between the light tunnel and the SLM, the illumination optics configured to direct the portion of the second light towards the SLM, direct the third light towards the SLM, and direct the portion of the fifth light towards the SLM; and
wherein the SLM is configured to:
modulate the third light to produce first modulated light;
modulate the portion of the second light to produce second modulated light; and
modulate the portion of the fifth light to produce third modulated light.

4. The system of claim 3, further comprising projection optics optically coupled to the SLM, wherein the projection optics is configured to:
project the first modulated light;
project the second modulated light; and
project the third modulated light.

5. The system of claim 1, wherein the light tunnel has an output face having a 16:9 aspect ratio.

6. The system of claim 1, wherein the transmissive static phosphor is yellow, the first color filter segment is green, and the second color filter segment is red.

7. A system comprising:
a first light source configured to produce first light having a first color;
a second light source configured to produce second light having the first color;
a third light source configured to produce third light having the first color;
a transmissive static phosphor optically coupled to the first light source, to the second light source, and to the third light source,
the transmissive static phosphor comprising a transmissive phosphor segment and a first open segment,
the first open segment configured to transmit the first light, and
the transmissive phosphor segment configured to:
produce fourth light having a second color and a third color in response to receiving the second light; and
produce fifth light having the second color and the third color in response to receiving the third light;
a color filter optically coupled to the transmissive static phosphor, the color filter having a first half and a second half, the second half having a first quarter and a second quarter,
the color filter comprising a first filter segment in the first half, a second filter segment in the first quarter, and a second open segment in the second quarter, the first filter segment configured to transmit a portion of the fourth light having the second color, the second filter segment configured to transmit a portion of the fifth light having the third color, and the second open segment configured to transmit the first light;
a light tunnel optically coupled to the color filter, the light tunnel configured to transmit the portion of the fourth light having the second color, the portion of the fifth light having the third color, and the first light; and
a spatial light modulator (SLM) optically coupled to the light tunnel, the SLM configured to modulate the portion of the fourth light having the second color, the third light, and the portion of the fifth light having the third color, to produce modulated light.

8. The system of claim 7, wherein the first light source, the second light source, and the third light source are laser diodes.

9. The system of claim 7, wherein:
during a first period of time:
the first light source is configured to produce the first light;
the second light source is configured to not produce the second light; and
the third light source is configured to not produce the third light;
during a second period of time:
the first light source is configured to not produce the first light;
the second light source is configured to produce the second light; and
the third light source is configured to not produce the third light; and
during a third period of time:
the first light source is configured to not produce the first light;
the second light source is configured to not produce the second light; and
the third light source is configured to produce the third light.

10. The system of claim 7, wherein the first color is blue, the second color is red, and the third color is green.

11. The system of claim 7, further comprising illumination optics optically coupled between the light tunnel and the SLM.

12. The system of claim 7, further comprising projection optics optically coupled to the SLM.

13. The system of claim 7, wherein the light tunnel has an output face having a 16:9 aspect ratio.

14. The system of claim 7, wherein the transmissive static phosphor is yellow, the first filter segment is green, and the second filter segment is red.

15. A method comprising:
producing, by a first light source, first light having a first color;
producing, by a second light source, second light having the first color;
producing, by a third light source, third light having the first color;
transmitting, by a first open segment of a transmissive static phosphor, the first light;
producing, by a transmissive phosphor segment of the transmissive static phosphor, fourth light having a second color and a third color in response to receiving the second light;
producing, by the transmissive phosphor segment of the transmissive static phosphor, fifth light having the second color and the third color in response to receiving the third light;
transmitting, by a first filter segment of a color filter, a portion of the fourth light having the second color;
transmitting, by a second filter segment of the color filter, portion of the fifth light having the third color;
transmitting, by a second open segment of the color filter, the first light, wherein the first filter segment is in a first half of the color filter, the second filter segment is in a first quarter of the color filter, and the second open segment is in a second quarter of the color filter; and transmitting, by a light tunnel, the portion of the fourth light having the second color, the portion of the fifth light having the third color, and the first light.

16. The method of claim 15, further comprising modulating, by a spatial light modulator (SLM), the portion of the fourth light having the second color, the third light, and the portion of the fifth light having the third color, to produce modulated light.

17. The method of claim 15, further comprising:
during a first period of time:
 producing, by the first light source, the first light;
 not producing, by the second light source, the second light; and
 not producing, by the third light source, the third light;
during a second period of time:
 not producing, by the first light source, the first light;
 producing, by the second light source, the second light; and
 not producing, by the third light source, the third light; and
during a third period of time:
 not producing, by the first light source, the first light;
 not producing, by the second light source, the second light; and
 producing, by the third light source, the third light.

18. The method of claim 15, wherein the first color is blue, the second color is red, and the third color is green.

19. The method of claim 15, wherein the light tunnel has an output face having a 16:9 aspect ratio.

20. The method of claim 15, wherein the transmissive static phosphor is yellow, the first filter segment is green, and the second filter segment is red.

* * * * *